US012728780B2

(12) United States Patent
Kim et al.

(10) Patent No.: US 12,728,780 B2
(45) Date of Patent: Sep. 8, 2026

(54) KNOB-INTERLOCKING ARMREST ASSEMBLY

(71) Applicant: SEOYON E-HWA CO., LTD., Anyang (KR)

(72) Inventors: Jae Min Kim, Ansan (KR); Bong Ju Choi, Anyang (KR)

(73) Assignee: SEOYON E-HWA CO., LTD., Anyang (KR)

(*) Notice: Subject to any disclaimer, the term of this patent is extended or adjusted under 35 U.S.C. 154(b) by 192 days.

(21) Appl. No.: 18/823,831

(22) Filed: Sep. 4, 2024

(65) Prior Publication Data

US 2025/0100434 A1 Mar. 27, 2025

(30) Foreign Application Priority Data

Sep. 22, 2023 (KR) ........................ 10-2023-0127114

(51) Int. Cl.
*B60N 2/75* (2018.01)

(52) U.S. Cl.
CPC .................................... *B60N 2/767* (2018.02)

(58) Field of Classification Search
CPC ......... B60N 2/767; B60N 2/763; B60N 2/753
See application file for complete search history.

(56) References Cited

U.S. PATENT DOCUMENTS 5,984,416 A * 11/1999 Waldo ...................... A47C 1/03 297/411.32
9,937,827 B1 4/2018 Choi
2020/0047651 A1* 2/2020 Faccin ................... B60N 2/753
2020/0100594 A1* 4/2020 Fietz ...................... A47C 7/541
2022/0314855 A1* 10/2022 Li ............................ B60R 7/04
2023/0158931 A1 5/2023 Li
2025/0100433 A1* 3/2025 Kim ....................... B60N 2/753

FOREIGN PATENT DOCUMENTS

DE 102021132508 A1 10/2022
KR 10-0371541 B1 2/2003
KR 10-1407265 B1 6/2014
KR 10-1836472 B1 3/2018
KR 10-2403655 B1 5/2022
KR 10-2022-0102686 A 7/2022
KR 10-2422966 B1 7/2022
KR 10-2023-0081728 A 6/2023

OTHER PUBLICATIONS

KR OA mailed Dec. 7, 2022.
Office Action From German Patent Office Dated Nov. 25, 2025, Issued for German Patent Application No. 102024127129.9.

* cited by examiner

*Primary Examiner* — Alfred J Wujciak
(74) *Attorney, Agent, or Firm* — Harvest IP Law, LLP

(57) ABSTRACT

The armrest assembly includes a locking device for restricting an armrest when the armrest assumes a locking posture, thereby limiting rotation of the armrest. The locking device includes a lock shaft fixed on the center of rotation of the armrest and a lock provided at the armrest so as to be movable in a locking direction approaching the lock shaft and an unlocking direction away from the lock shaft in accordance with operation of the knob. A locking section including a recess into which a lock tooth is inserted when the armrest is in the locking posture and an unlocking section extending from the locking section are formed along the periphery of the lock shaft, and the unlocking section includes an unlocking surface that contacts a tooth end to maintain the lock in the state of being moved in the unlocking direction.

16 Claims, 16 Drawing Sheets

KNOB-INTERLOCKING ARMREST ASSEMBLY

CROSS-REFERENCE TO THE RELATED APPLICATION

The present application claims priority to and the benefit of Korean Patent Application No. 10-2023-0127114, filed on Sep. 22, 2023, in the Korean Intellectual Property Office, the entire disclosure of which is incorporated herein by reference.

BACKGROUND

1. Field

Embodiments of the present disclosure relate to an armrest assembly for vehicles.

2. Description of the Related Art

Vehicles include an armrest for convenience of an occupant such as a driver. Currently, such an armrest is provided and used in various forms in vehicles. For example, an armrest is provided in a form of constituting a seat, such as a front seat or a rear seat, in the interior (cabin) of vehicles or a form of constituting a center console disposed between a driver seat and a front passenger seat in the interior of vehicles.

In general, an armrest for vehicles is configured to be rotatable about an axis. Rotation of an armrest for vehicles may be controlled mainly by a knob provided at a distal end of the armrest and a locking module configured to interlock with the knob. In accordance with operation of the knob by an occupant, the locking module may implement a locking mode of restricting the armrest to prevent rotation of the armrest or an unlocking mode of releasing restriction of the armrest to allow rotation of the armrest. The locking module is operated upon receiving operational force, applied to the knob by an occupant, through a wire or a cable.

However, the related art has a problem in that the interlocking structure using the wire (or cable) is very complicated and/or a problem in that the interlocking structure operates incorrectly (i.e., malfunctions) due to an error in the length of the wire, elongation and contraction of the wire caused by change in ambient temperature, permanent change in the length of the wire caused by long-term use, or the like. In particular, as one example of malfunction of the interlocking structure, there occurs phenomenon in which force by which the armrest is restricted is weakened due to the structural problem of the locking module, the characteristics of the wire, or the like and thus restriction of the armrest is inadvertently released. Therefore, the wire and the locking module connected to each other are provided in plural in order to compensate for malfunction of the interlocking structure. Due to the above problems, manufacture of the conventional armrest and/or maintenance thereof is costly.

There is another problem in that an occupant must operate the knob in order to switch the mode of the locking module from the unlocking mode to the locking mode or must continuously apply operational force to the knob in order to maintain the locking module in the unlocking mode. In this way, the knob needs to be frequently operated, which causes great inconvenience in use.

In addition, in a case in which the armrest is provided in a form of constituting a center console between a driver seat and a front passenger seat, the armrest may act as an element that restricts or interferes with action of an occupant sitting in the driver seat or the front passenger seat.

Meanwhile, one of the requirements for future vehicles such as electric vehicles is to achieve a wider variety of seat variations. In the art to which the disclosure pertains, research and development is being actively conducted to more efficiently implement forward/backward movement of a seat, leftward/rightward movement of a seat, swiveling of a seat, etc. for seat variation. In this situation, however, conventional armrests constituting a center console may greatly hinder seat variation.

SUMMARY

Embodiments of the present disclosure provide a knob-interlocking armrest assembly for vehicles capable of accurately controlling rotation of an armrest with a more simplified structure.

In addition, embodiments of the present disclosure provide a knob-interlocking armrest assembly for vehicles capable of being used more conveniently.

In addition, embodiments of the present disclosure provide a knob-interlocking armrest assembly for vehicles allowing not only an occupant on a front seat but also an occupant on a rear seat to use an armrest. In one example, an armrest is provided as a table for a rear seat.

In addition, embodiments of the present disclosure provide a knob-interlocking armrest assembly for vehicles that is advantageous in terms of seat variation.

The objects to be accomplished by the disclosure are not limited to the above-mentioned objects, and other objects not mentioned herein will be clearly understood those skilled in the art from the following by description.

According to an embodiment of the present disclosure, there may be provided an armrest assembly for vehicles, which includes an armrest mount, an armrest mounted on the armrest mount and configured to be rotatable about a first axis extending in a leftward-rightward direction, the armrest being configured to be changeable in posture to a first posture with a distal end facing forward, a second posture with the distal end facing downward, or a third posture with the distal end facing backward in accordance with rotation of the armrest, an operation module provided at the armrest, the operation module including a knob configured to switch from a locking state to an unlocking state in response to operation by an occupant of the vehicle and to return to the locking state using elastic force when operation by the occupant is released, a lock shaft fixed on the first axis, and a main lock provided at the armrest so as to be movable in a first direction away from the lock shaft or a second direction approaching the lock shaft in accordance with operation of the knob, wherein the lock shaft includes a locking section having a locking recess and an unlocking section extending to both sides from the locking section, the locking section and the unlocking section being formed along the periphery of the lock shaft, and the main lock includes a locking tooth. When the armrest is in the first posture, if the main lock is moved in the first direction, the locking tooth is inserted into the locking recess, and if the main lock is moved in the second direction, the locking tooth is separated from the locking recess. The unlocking section includes an unlocking surface configured to be brought into contact with a tooth end of the locking tooth to maintain the main lock in the state of being moved in the second direction.

The main lock may be configured to be rotatable about a $2A^{th}$ axis parallel to the first axis. When the main lock is rotated in a first rotational direction, the main lock may be moved in the first direction, and when the main lock is rotated in a second rotational direction opposite the first rotational direction, the main lock may be moved in the second direction.

The main lock may include a front surface on which the locking disposed and a back surface opposite the front surface. The main lock may include two shoulders protruding from the back surface thereof and an interlocking recess formed between two shoulders. Among two shoulders, a second shoulder may be spaced apart from a first shoulder in the direction in which the armrest is moved when rotated in the second rotational direction. The armrest assembly for vehicles according to the embodiment of the present disclosure may further include a sub-lock provided at the armrest, the sub-lock being configured to be rotatable about a $2B^{th}$ axis parallel to the $2A^{th}$ axis and to be rotated in cooperation with the knob. Here, the sub-lock may include an interlocking tooth configured to be brought into contact with a second shoulder inner wall in the interlocking recess when the sub-lock is rotated in the first rotational direction, thereby rotating the main lock in the second rotational direction, and to be brought into contact with a first shoulder inner wall in the interlocking recess when the sub-lock is rotated in the second rotational direction, rotating the main lock in the first rotational direction. In addition, the interlocking tooth may include a tooth base disposed on the $2B^{th}$ axis and a tooth head protruding from the tooth base, and when the sub-lock is rotated in the first rotational direction, the tooth base may be brought into contact with the first shoulder inner wall, and the tooth head may be brought into contact with the second shoulder inner wall, so that the interlocking tooth may transmit rotational force of the sub-lock in the first rotational direction to the main lock in a manner of distributing the rotational force in two opposite rotational directions through the first shoulder and the second shoulder.

The armrest may include a proximal end disposed on the first axis, the knob may be disposed close to a distal end of the armrest, and the operation module may include a link mechanism configured to transmit operational force applied to the knob to the sub-lock.

The operation module may further include a knob cover comprising a head opening disposed close to the distal end of the armrest and a tail opening disposed opposite the head opening. The knob may be provided in the knob cover so as to be rotatable about a knob axis extending in a leftward-rightward direction. In addition, the knob may include a knob head disposed close to the head opening and a knob tail disposed opposite the knob head with respect to the knob axis and connected to the link mechanism through the tail opening. The knob cover may be configured to be brought into contact with an upper surface of the knob tail or a lower surface of the knob tail in accordance with rotation of the knob to limit rotation of the knob.

The knob may include a buffer element provided on each of the upper surface and the lower surface of the knob tail, which come into contact with the knob cover. The buffer element may be a buffer pad.

The link mechanism may include a link bar configured to be movable toward the distal end and the proximal end of the armrest, an input link disposed between the knob and the link bar, the input link being configured to move the link bar toward the distal end or the proximal end of the armrest in accordance with rotation of the knob, and an output link disposed between the link bar and the sub-lock, the output link being configured to rotate the sub-lock in accordance with movement of the link bar.

The link mechanism may be configured such that, when the knob is operated by an occupant, the input link moves the link bar toward the distal end of the armrest and the output link rotates the sub-lock in the second rotational direction, and the operation module may further include an elastic member configured to provide elastic force to the link bar toward the proximal end of the armrest.

Each of the input link and the output link may be a rotation link configured to be rotated about a link axis extending in the leftward-rightward direction. The operation module may further include a link guide configured to guide movement of the link bar. The link guide may include guide members in contact with a left side and a right side of a straight section of the link bar, respectively, and contact members in contact with an upper side and a lower side of the straight section, respectively. Each of the contact members may be elastically deformable in accordance with upward/downward movement of the link bar caused by rotation of the input link and the output link in the process in which the link bar is moved toward the distal end and the proximal end of the armrest.

The armrest mount may be disposed between a driver seat and a front passenger seat, each being a front seat. When the armrest is in the first posture, the armrest may be provided to an occupant on the front seat, and when the armrest is in the third posture, the armrest may be provided to an occupant on a rear seat.

The armrest mount may include a support configured to support the armrest in an erected state so that the armrest is rotatable about the first axis. In addition, when the armrest is in the second posture, the armrest may be folded with respect to the support.

The armrest mount may further include a fixed member and a movable member coupled onto the fixed member so as to be movable in a horizontal direction. The support may be provided at the movable member.

The armrest mount may further include a stop unit configured to fix the position of the movable member with respect to the fixed member.

The locking section and the unlocking section may be connected to each other via a curved guide surface. The curved guide surface may guide the locking tooth, the tooth end of which is in contact with the unlocking surface, to the locking recess.

According to an embodiment of the present disclosure, there may be provided an armrest assembly for vehicles, which includes an armrest mount, an armrest mounted on the armrest mount and configured to be rotatable about a main axis (first axis), the armrest being configured to be changed in posture in accordance with rotation thereof, a knob provided at the armrest, a lock shaft fixed on the main axis, a lock provided at the armrest so as to be movable in a locking direction approaching the lock shaft and an unlocking direction away from the lock shaft, and a link mechanism including a plurality of links configured to allow the lock to interlock with the knob, wherein the lock shaft includes a locking recess, and the lock includes a locking tooth. When the armrest is in a locking posture, if the lock is moved in the locking direction, the locking tooth is inserted into the locking recess, and if the lock is moved in the unlocking direction, the locking tooth is separated from the locking recess.

Solutions to solve the above problems may be concretely and clearly understood through embodiments to be described below and the accompanying drawings. In addition, various solutions other than the above solutions may be further provided.

BRIEF DESCRIPTION OF THE DRAWINGS

The accompanying drawings, which are incorporated in this specification, illustrate exemplary embodiments and serve to further illustrate the technical ideas of the disclosure in conjunction with the detailed description of exemplary embodiments that follows, and the disclosure is not to be construed as limited to what is shown in such drawings. In the drawings.

DETAILED DESCRIPTION OF EXEMPLARY EMBODIMENTS

Figure 1:
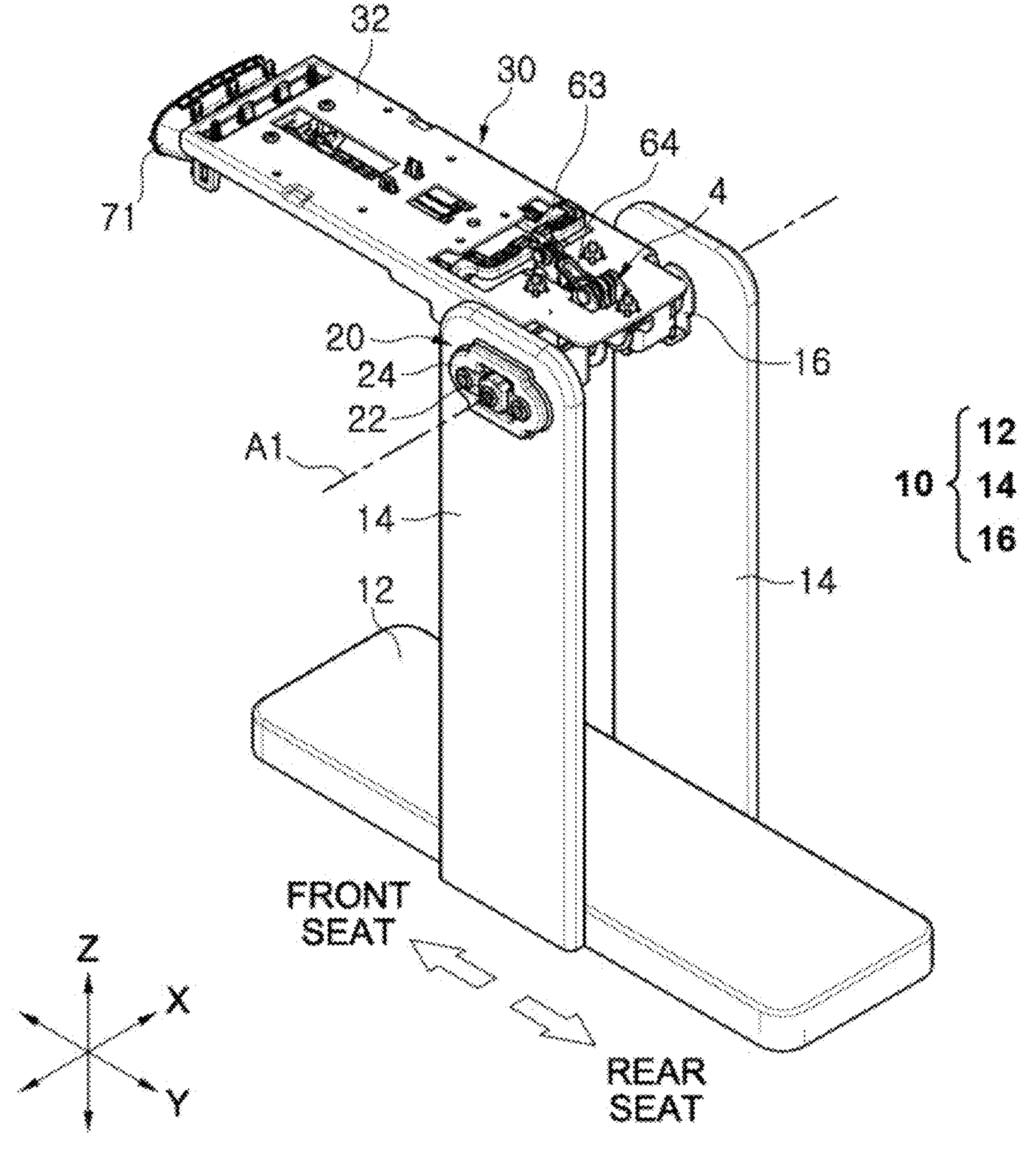
FIG. 1 is a perspective view showing an armrest assembly for vehicles according to an embodiment of the present disclosure.

Hereinafter, embodiments of the present disclosure will be described in detail with reference to the accompanying drawings so that those skilled in the art can easily carry out the embodiments. The present disclosure may, however, be embodied in many different forms, and should not be construed as being limited to the embodiments set forth herein.

In the following description of the embodiments of the present disclosure, a detailed description of known functions or configurations incorporated herein will be omitted when it may unnecessarily obscure the subject matter of the present disclosure. Throughout the drawings, parts performing similar functions and operations are denoted by the same reference numerals.

At least some of the terms used in this specification are terms defined taking into consideration the functions obtained in accordance with the present disclosure, and may be changed in accordance with the intention of users or operators or usual practice. Therefore, the definitions of these terms should be determined based on the total content of this specification. Further, throughout the specification, when a component is referred to as including another component, it is to be understood that it may further include other components, not excluding other components unless specifically indicated otherwise. Further, when a part is said to be connected (or coupled) to another part, the part and the other part may be directly connected (or coupled) to each other, or may be indirectly connected (or coupled) to each other with one or more intervening parts interposed therebetween.

In the drawings, the sizes or shapes of components and the thicknesses of lines may be exaggerated for convenience of explanation.

The present disclosure may provide an armrest assembly including an armrest disposed in the cabin of a vehicle in order to improve convenience of an occupant. In addition, the present disclosure may also provide a vehicle including such an armrest assembly. The armrest assembly according to the present disclosure is applicable to various elements constituting the cabin of the vehicle. However, the embodiments of the present disclosure will be described based on an example in which the armrest assembly is employed in place of a center console between a driver seat and a front passenger seat in the cabin of the vehicle.

The configuration and operation of the armrest assembly according to the embodiment of the present disclosure are shown in FIGS. 1 to 16.

As shown in FIG. 1, the armrest assembly according to the embodiment of the present disclosure may include an armrest mount 10, a shaft module 20, and an armrest 30.

The armrest assembly may be mounted by the armrest mount 10 in the cabin of the vehicle. Although not shown in the drawings, the vehicle may include a front seat and a rear seat provided with an interval therebetween in a forward-backward direction (Y-axis direction) in the cabin. The front seat may be composed of a driver seat and a front passenger seat arranged in a leftward-rightward direction (X-axis direction). For reference, the forward-backward direction may be a direction collectively referring to the forward direction of the vehicle and the backward direction of the vehicle. The leftward-rightward direction may be referred to as a width direction. The forward-backward direction may be referred to as a longitudinal direction.

The armrest mount 10 may be provided to be located between the driver seat and the front passenger seat in the cabin of the vehicle. As shown in FIG. 1, the armrest mount 10 may include a base 12 disposed in the space between the driver seat and the front passenger seat, a support 14 provided extending vertically from the base 12 in an upward-downward direction (Z-axis direction), and a fixed bracket 16 fixed attached to an upper end portion of the support 14. The upward-downward direction may be referred to as a height direction.

The base 12 may be mounted on a floor that defines the space between the driver seat and the front passenger seat. Although not shown in the drawings, the base 12 may include a fixed member and a movable member. The movable member is provided on the fixed member and is designed slide in a horizontal direction (a direction perpendicular to the upward-downward direction) and can be repositioned in accordance with the moving direction. The base 12 may further include a stop unit that restricts the movable member relative to the fixed member, thereby securing the position of the movable member.

In one example, the movable member may be capable of sliding horizontally in the forward-backward direction, while the stop unit may include a pressing body that penetrates the movable member and moves in the upward-downward direction. The pressing body may have a bolt structure that is screwed to the movable member, and thus may move upward or downward depending on the direction that the blot structure rotates. The lower end of the pressing body may be brought into close contact with (pressed against) the upper surface of the fixed member to lock the movable member in place, or may be separated (or released) upward from the upper surface of the fixed member, to release the movable member, in accordance with upward/downward movement of the pressing body.

The support 14 may be coupled at its lower end portion to the base 12. Specifically, the lower end portion of the support 14 may be coupled to the movable member of the base 12. For example, the support 14 may be provided in a panel structure in which the width thereof is less than the length thereof. Two supports 14 may be provided so as to be spaced apart from each other in the leftward-rightward direction and to face each other.

Figure 5:
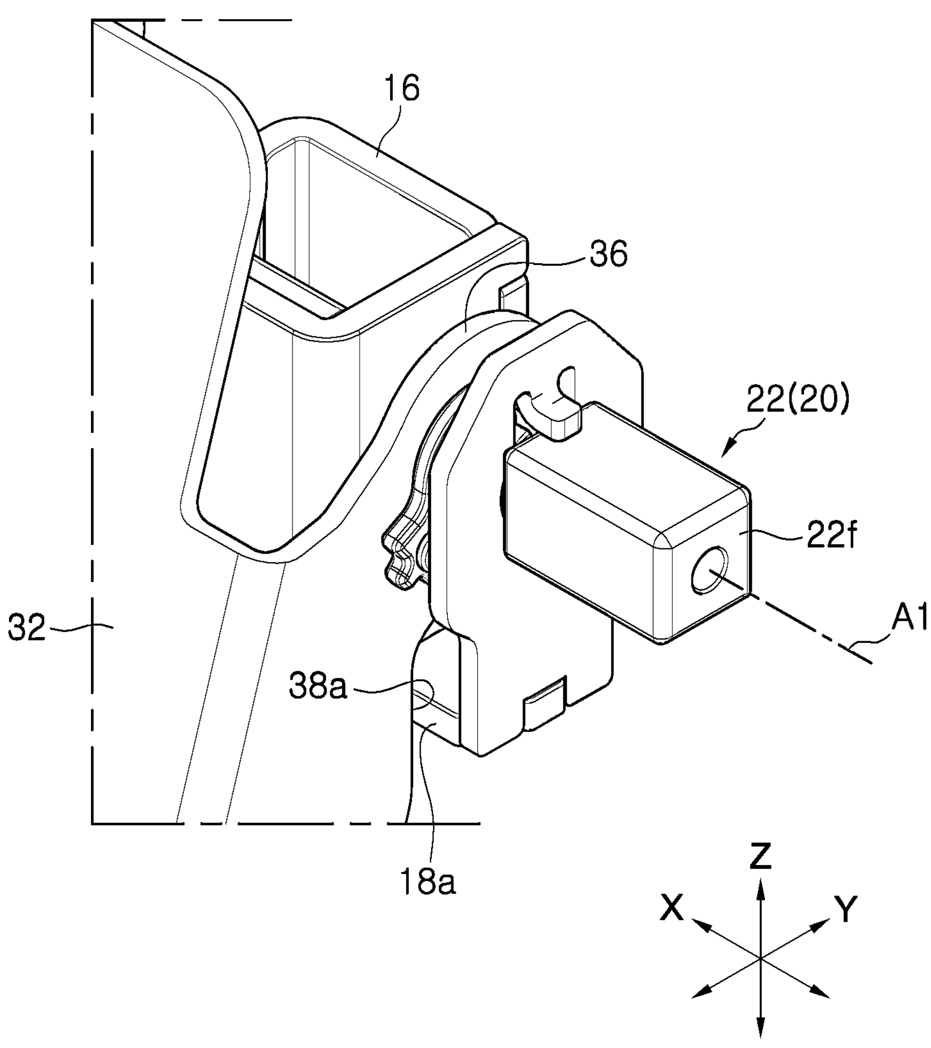
FIGS. 5 and 6 are perspective views showing a portion of the armrest in states in which the posture of the armrest is the second posture and the third posture, respectively, in the armrest assembly for vehicles according to the embodiment of the present disclosure.
Figure 6:
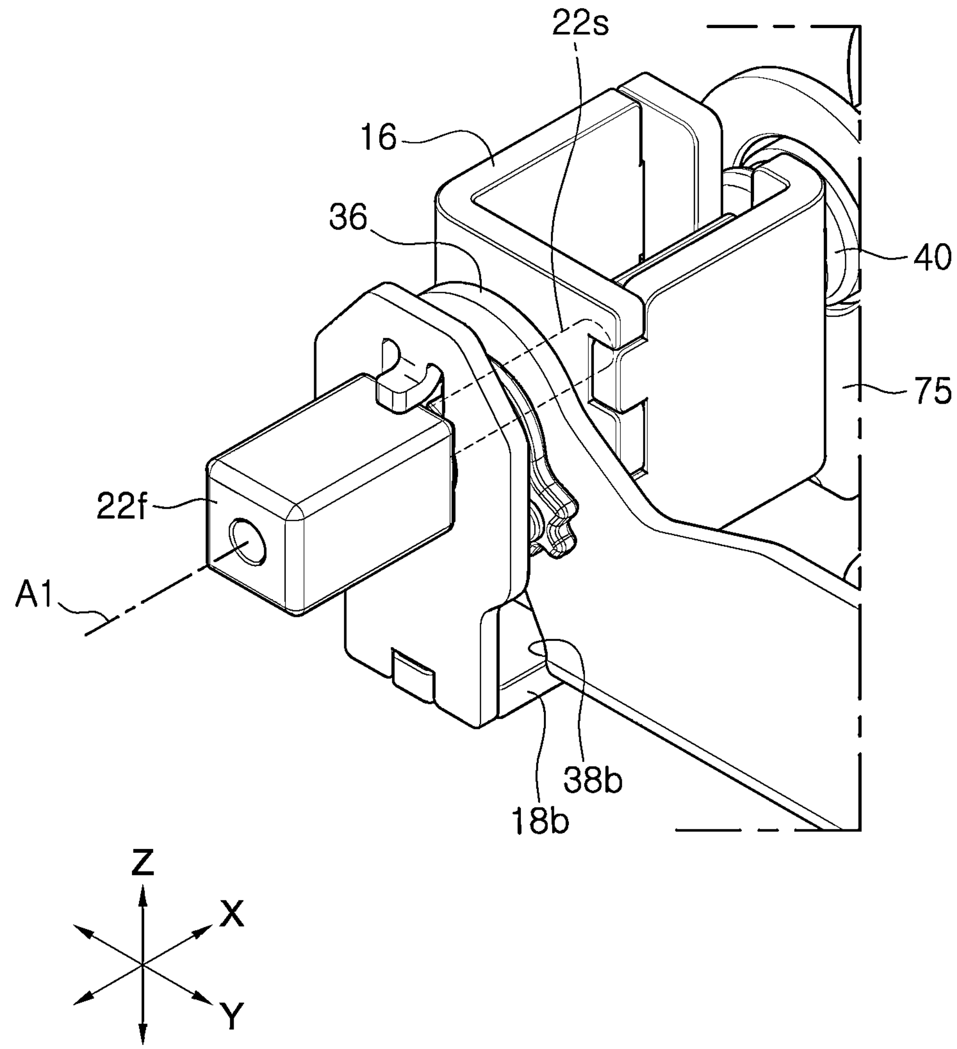

Referring to FIGS. 5 and 6, the armrest mount 10 may stably support the shaft module 20 using the fixed bracket 16. The fixed bracket 16 may be firmly mounted to the upper end portion of each of two supports 14 by means of a mounting pin (not shown) or the like so as to be fixed in position. Two fixed brackets 16 may be disposed on inner sides of two supports 14 so as to face each other—one in the left side and the other in the right side.

As shown in FIGS. 1, 5, and 6, the shaft module 20 may include two shaft members 22 configured to provide a first axis A1 extending horizontally in the leftward-rightward direction (X-axis direction), and these shaft members 22 may be supported by the left and right fixed brackets 16, respectively. The shaft members 22 may be fixed shafts that are maintained in a stationary state, and may each include a fixed portion 22*f* and a support portion 22*s* disposed in the leftward-rightward direction. Each of the shaft members 22 may function as a fixed shaft because the fixed portion 22*f* is firmly mounted to the support 14 by means of a fixed panel 24 in a state in which the support portion 22*s* is supported and fixed in position by the fixed bracket 16.

Referring to FIGS. 1 and 5, the armrest 30 may be formed to have a predetermined length, and may include a distal end portion 30*a* and a proximal end portion 30*b* formed on both ends thereof in an extension direction of the armrest 30. The proximal end portion 30*b* may be configured to be rotatable about the first axis A1. Such an armrest 30 may include an armrest frame 32 including a distal end portion and a proximal end portion, which correspond to the distal end portion 30*a* and the proximal end portion 30*b* of the armrest 30, respectively. The armrest 30 may also include a hinge bracket 36 provided at the armrest frame 32. In addition, as shown in FIG. 2, the armrest 30 may further include a housing 34 configured to accommodate the fixed bracket 16, the armrest frame 32, and the hinge bracket 36 to protect the same from the outside.

Figure 7:
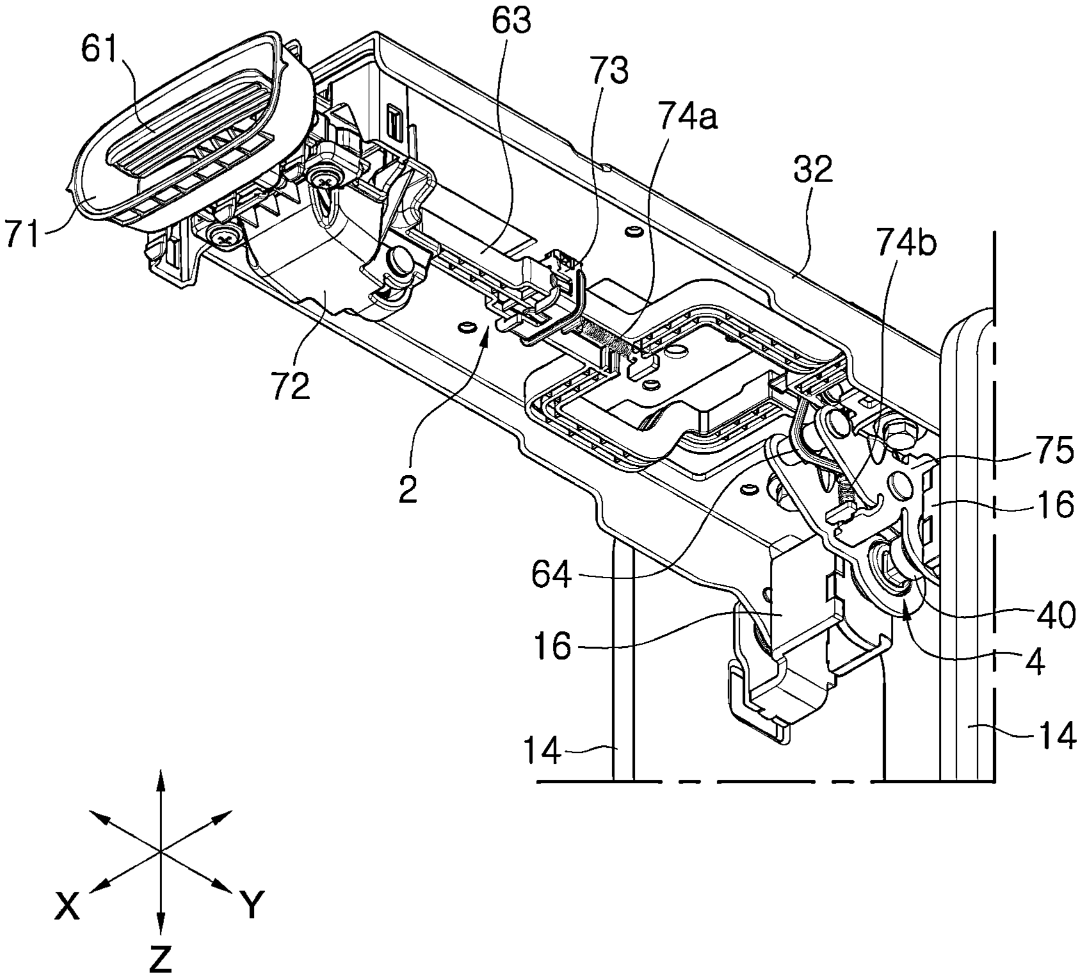
FIG. 7 is a perspective view mainly showing a knob-interlocking locking device in the armrest assembly for vehicles according to the embodiment of the present disclosure.

As shown in FIGS. 5 to 7, two hinge brackets 36 may be rotatably coupled to the support portions 22*s* of two shaft members 22, respectively. The proximal end portion 30*b* of the armrest 30 may rotate about the first axis A1 because these hinge brackets 36 are connected to the proximal end portion of the armrest frame 32. The hinge brackets 36 may protrude from the lower surface of the armrest frame 32. In one example, each of the hinge brackets 36 may be disposed between the support 14 and the fixed bracket 16 coupled to each other, and may be integrated with the armrest frame 32. A rotational element configured to suppress increase in rotational speed of the armrest 30 using frictional force may be interposed between the support portion 22*s* of the shaft member 22 and the hinge bracket 36 of the armrest 30. The rotational element may induce the armrest 30 to rotate at a constant speed.

Such an armrest 30 may be changed in posture in accordance with rotation thereof about the first axis A1. In detail, the posture of the armrest 30 may be changed to a first posture in which the distal end portion 30*a* of the armrest 30 faces forward (refer to FIGS. 1 and 2), a second posture in which the distal end portion 30*a* of the armrest 30 faces downward (refer to FIG. 3), or a third posture in which the distal end portion 30*a* of the armrest 30 faces backward (refer to FIG. 4). The armrest 30 may be unfolded with respect to the armrest mount 10 when the posture of the armrest 30 is changed to the first posture and to the third posture, and may be folded with respect to the armrest mount 10 when the posture of the armrest 30 is changed to the second posture. The armrest 30 may be maintained in a horizontal state when the posture of the armrest 30 is changed to the first posture and to the third posture, and may be maintained in a downwardly inclined state (or almost vertical state) when the posture of the armrest 30 is changed to the second posture. For reference, in order to accommodate the armrest 30 in a folded state with respect to the armrest mount 10 when the posture of the armrest 30 is the second posture, the left and right supports 14 may be spaced apart from each other by a distance equal to or greater than the width of the armrest 30, and may be formed to extend vertically in the upward-downward direction (Z-axis direction). The height of the upper end portions of the support 14 are configured ensure a predetermined distance between the upper end portions and from the base 12.

Figure 2:
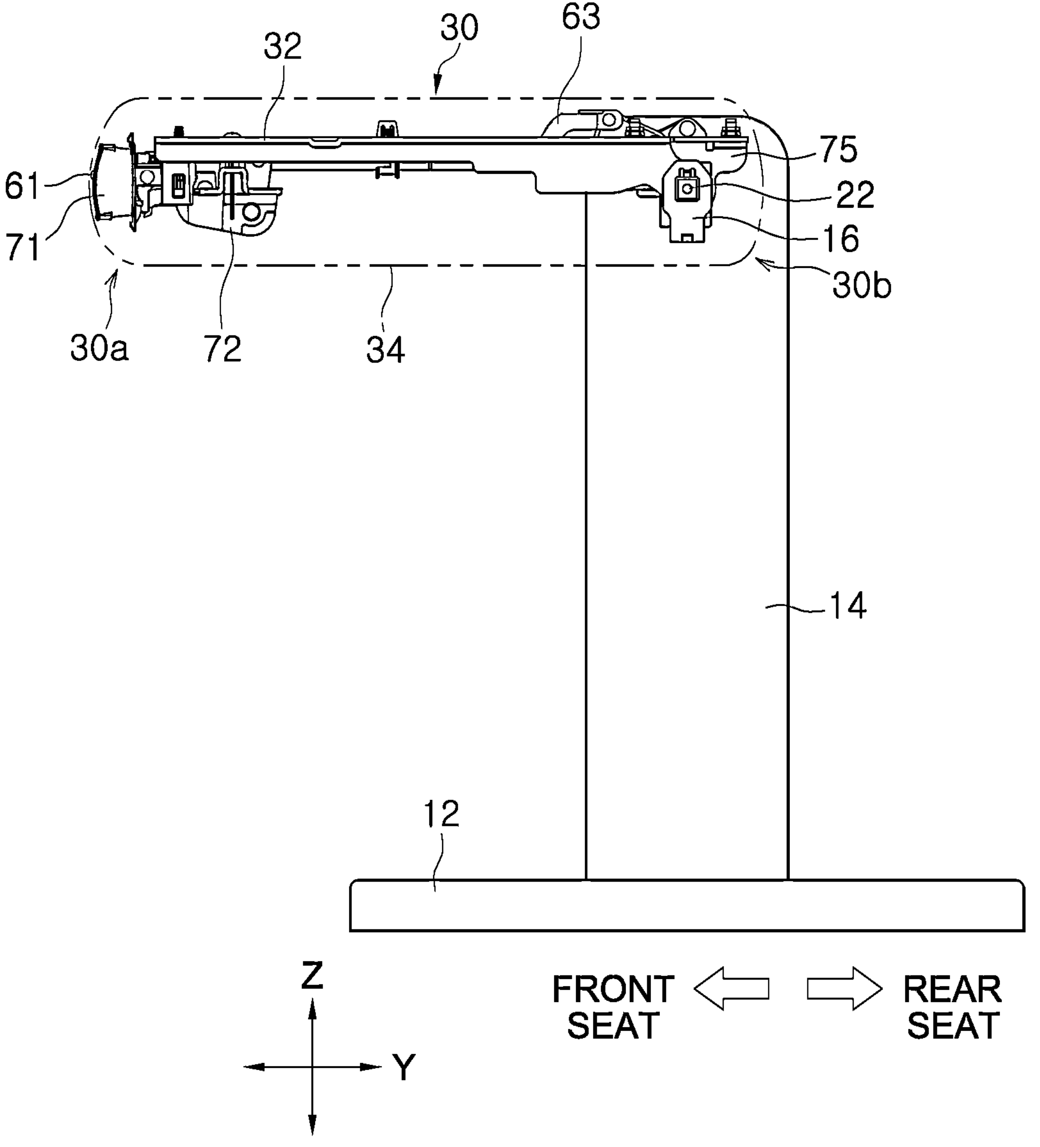
FIGS. 2 to 4 are schematic views showing states in which the posture of an armrest is a first posture, a second posture, and a third posture, respectively, in the armrest assembly for vehicles according to the embodiment of the present disclosure when viewed from the left.
Figure 3:
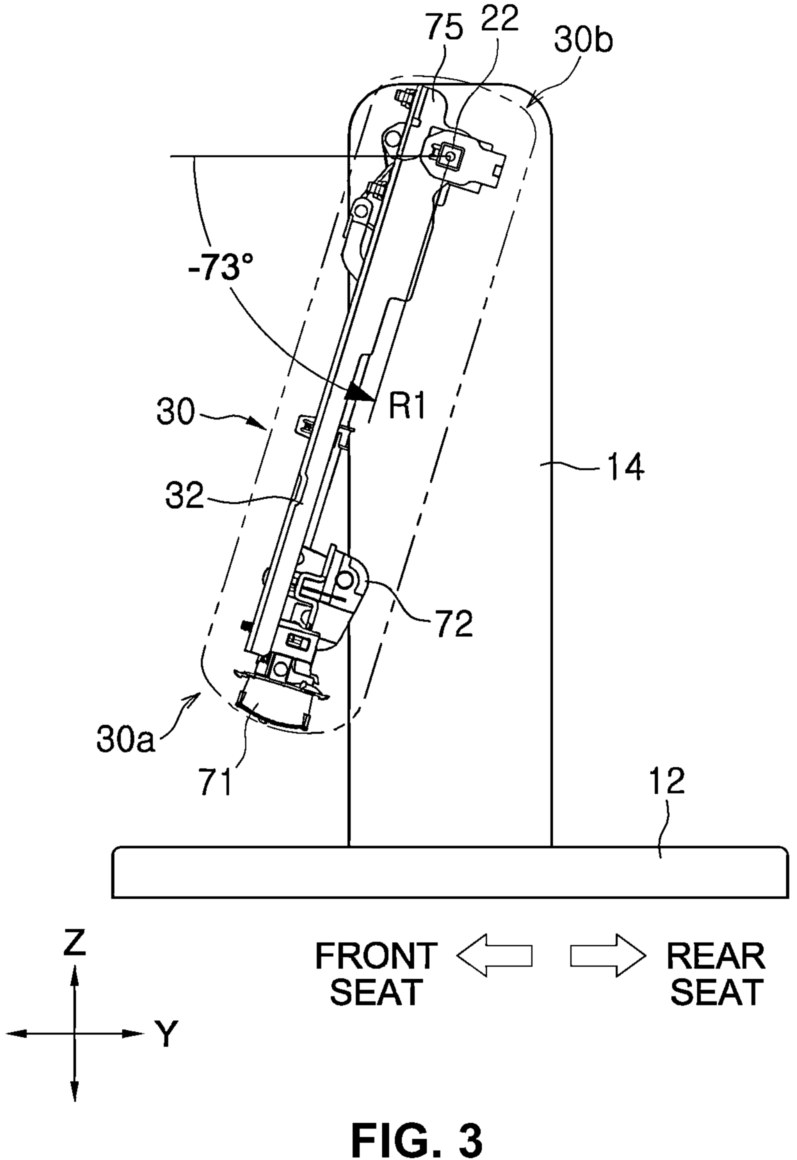
Figure 4:
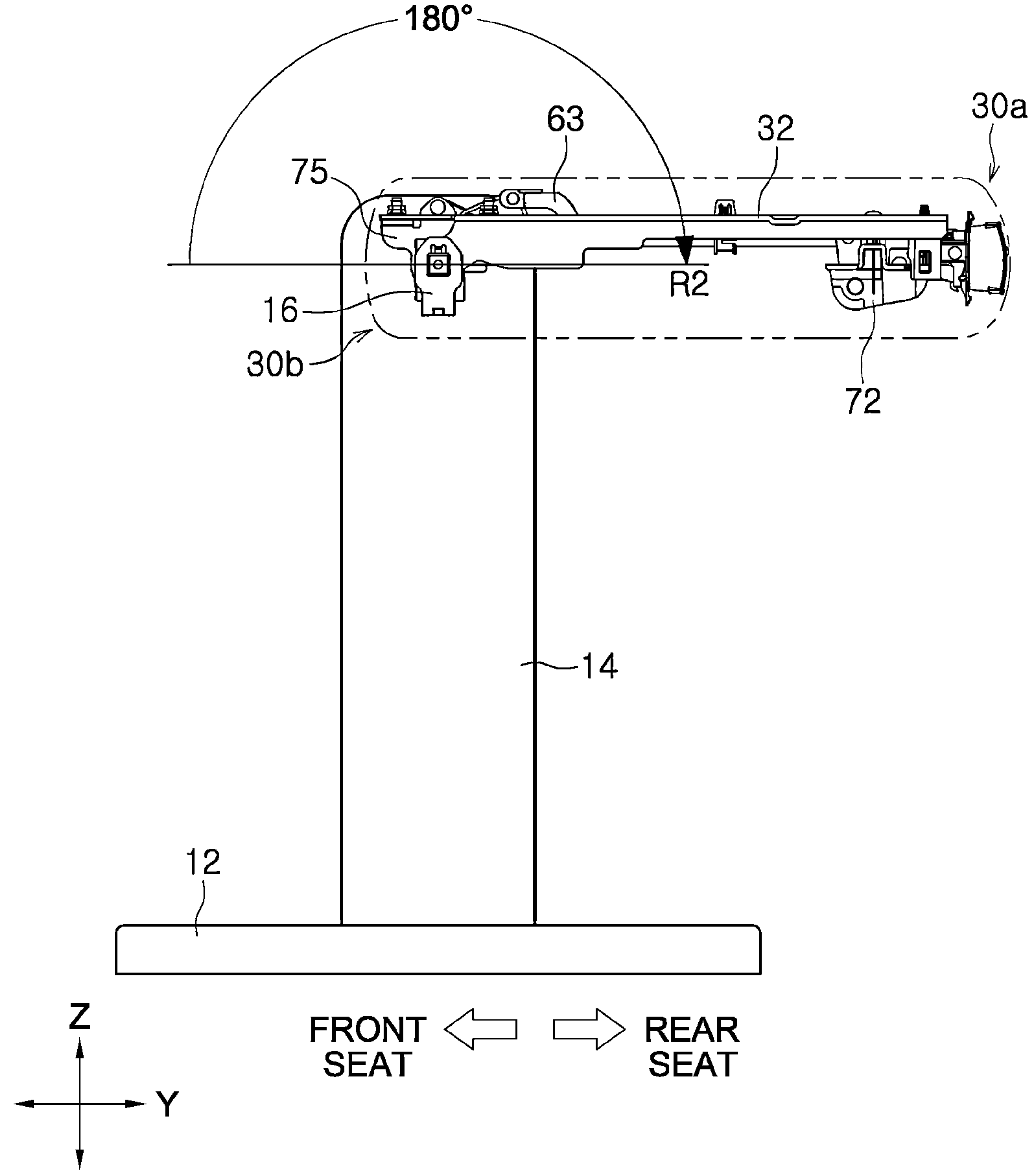

Referring to FIGS. 2 to 4, on the assumption that the angle of the armrest 30 when the posture of the armrest 30 is the first posture is 0 degrees, the second posture may be a posture at which the armrest 30 is rotated by a predetermined degree (e.g., 73 degrees) in a first rotational direction R1 from the first posture (0°), and the third posture may be a posture at which the armrest 30 is rotated to the opposite side (e.g., 180 degrees) second rotational direction R2, opposite the first rotational direction R1, from the first posture. Based on FIG. 2 showing the armrest assembly viewed from the left of the armrest 30, the first rotational direction R1 may be a counterclockwise (CCW) rotation direction, and the second rotational direction R2 may be a clockwise (CW) direction. While a rotational degree in the second rotational direction R2 is denoted as a positive number, a rotational degree in the first rotational direction R1 may be denoted as a negative number based on the first posture (0 degree).

As shown in FIG. 2, the armrest 30 may be provided such that the upper surface thereof faces upward between the driver seat and the front passenger seat, which are the front seats, when the posture thereof is the first posture (0°). Accordingly, an occupant sitting in the front seat may freely use the armrest 30 in a manner of, for example, comfortably leaning on the armrest 30 or placing his/her arm thereon.

As shown in FIG. 3, when the posture of the armrest 30 is changed from the first posture (0°) to the second posture (for example, −73°), the armrest 30 may be folded with respect to the armrest mount 10 and move out of the space between an occupant on the driver seat and an occupant on the front passenger seat. This movement creates an additional space between the occupant on the driver seat and the occupant on the front passenger seat. The occupants on the front seats may act more freely or may take a more comfortable posture thanks to the secured extra space.

As shown in FIG. 4, when the posture of the armrest 30 is changed from the first posture (0°) to the third posture (180°), the armrest 30 may be flipped 180 degrees. In this posture, the lower surface thereof may face upward and the distal end portion 30*a* thereof may protrude from the space between the driver seat and the front passenger seat toward the rear seat and become available to an occupant on the rear seat. Accordingly, the occupant on the rear seat may utilize the armrest 30 as a table or the like in a manner of, for example, as a mobile phone on the lower placing an item such surface of the armrest facing upward.

Meanwhile, at least one of the seats (the front seat, the rear seat, etc.) in the cabin of the vehicle may implement forward/backward movement, leftward/rightward movement, and/or swiveling for seat variation, and the posture of the armrest 30 may be selectively changed to a suitable posture among the first posture (0°), the second posture (−73°), and the third posture (180°) in accordance with seat variation.

When the posture of the armrest 30 is changed to the second posture (for example, −73°), the armrest 30 may be maintained in the second posture by a front stopper 18*a* (refer to FIG. 5), and when the posture of the armrest 30 is changed to the third posture (180°), the armrest 30 may be maintained in the third posture by a rear stopper 18*b* (refer to FIG. 6). The front stopper 18*a* may restrict the armrest 30 from being rotated by an angle exceeding the angle of the second posture in the first rotational direction R1, and the rear stopper 18*b* may restrict the armrest 30 from being rotated by an angle exceeding the angle of the third posture in the second rotational direction R2. The armrest mount 10 may be provided with the front stopper 18*a* and the rear stopper 18*b* described above. The front stopper 18*a* may be provided at a front portion of each of two fixed brackets 16, and the rear stopper 18*b* may be provided at a rear portion of each of two fixed brackets 16.

The front stoppers 18*a* may be provided to contact the armrest frame 32 when the armrest 30 rotates in the first rotational direction and its posture is changed to the second posture (−73°), thereby restricting further rotation of the armrest 30 in the first rotational direction R1. The rear stoppers 18*b* may be provided to contact the armrest frame 32 when the armrest 30 rotates in the second rotational direction and its posture is changed to the third posture (180°), thereby restricting further rotation of the armrest 30 in the second rotational direction R2. The armrest frame 32 may be formed to have a contact portion 38*a* (refer to FIG. 5) formed to be in contact with the front stoppers 18*a* when the posture of the armrest 30 is the second posture and a contact portion 38*b* (refer to FIG. 6) formed to be in contact with the rear stoppers 18*b* when the posture of the armrest 30 is the third posture.

Referring to FIGS. 1 and 7, the armrest assembly may further include a locking device (refer to an operation module 2 and a lock assembly 4) in order to control rotation of the armrest 30 when the posture of the armrest 30 is changed to the first posture (0°). When the posture of the armrest 30 is the first posture, the locking device may restrict the armrest 30 to prevent rotation of the armrest 30 (i.e., locking) or may release restriction of the armrest 30 to allow rotation of the armrest 30 (i.e., unlocking). When the armrest 30 is in the first posture, the armrest 30 may be restricted and maintained in the first posture by the locking device.

The locking device may include an operation module 2 for locking and unlocking operations and a lock assembly 4 configured to perform restriction and release on the armrest 30 in accordance with operation of the operation module 2.

Figure 8:
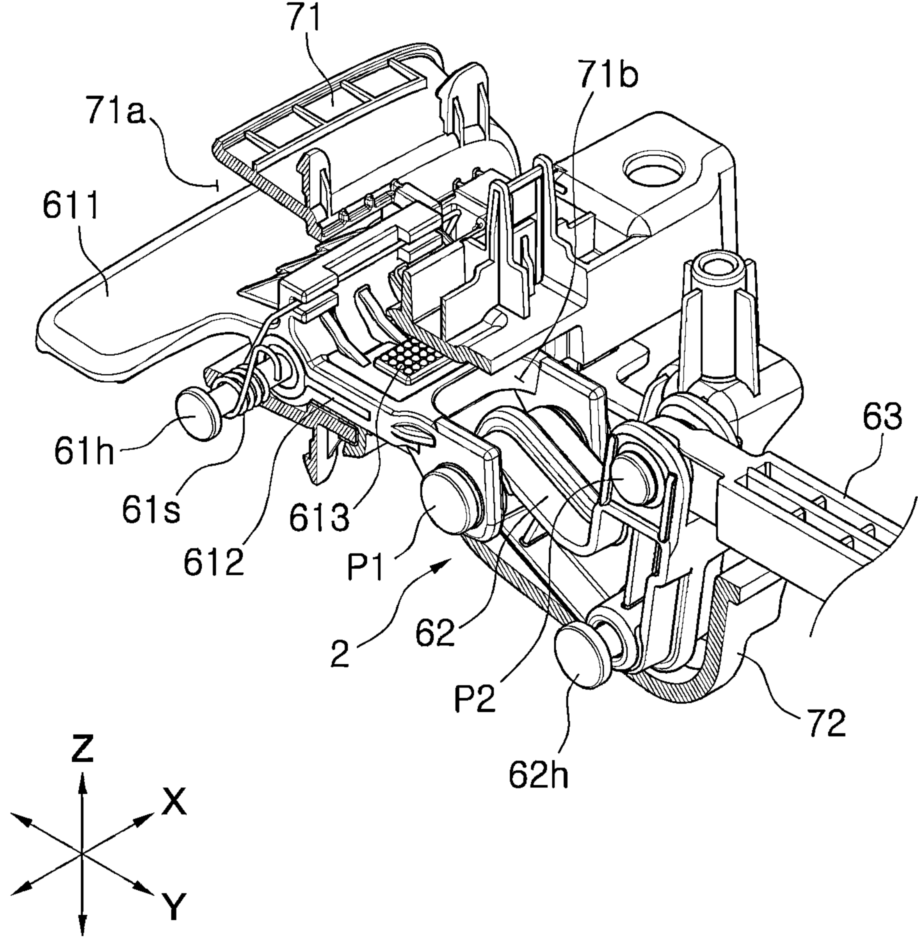
FIGS. 8 and 9 are, respectively, a perspective view and an exploded perspective view showing a distal end portion of the locking device shown in FIG. 7.
Figure 10:
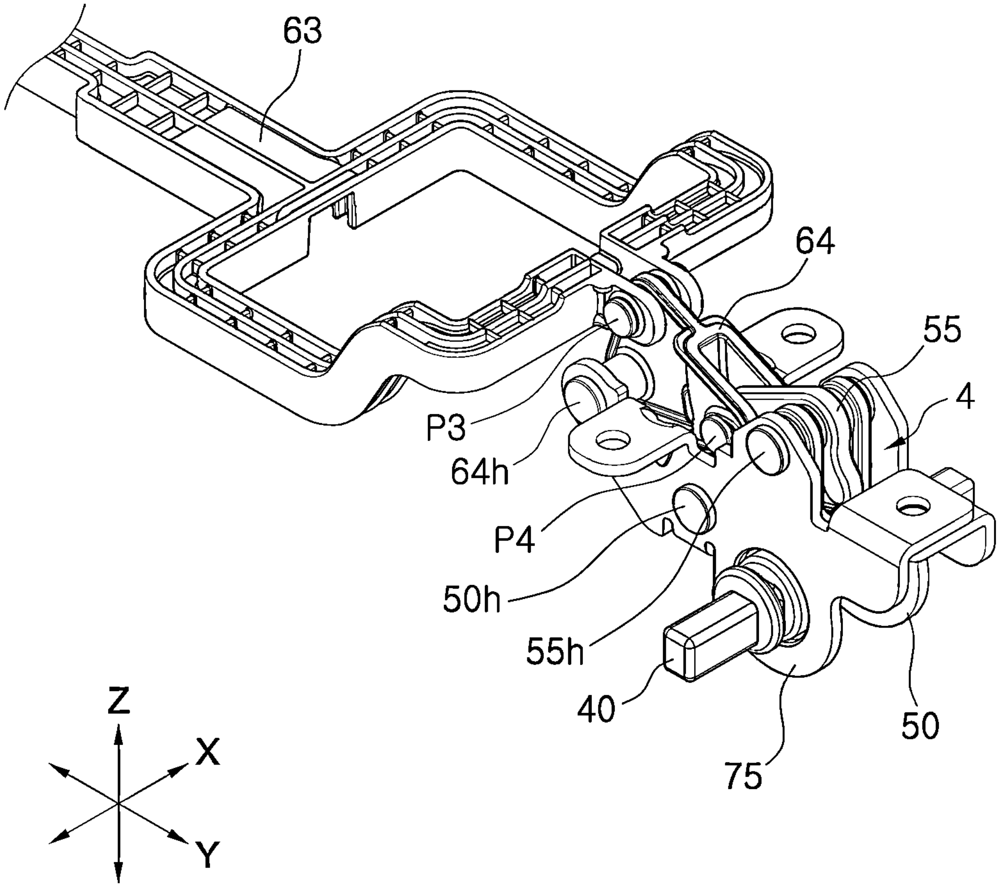
FIGS. 10 and 11 are, respectively, a perspective view and an exploded perspective view showing a proximal end portion of the locking device shown in FIG. 7.

The operation module 2 is provided at the armrest 30. Referring to FIGS. 7, 8, and 10, the operation module 2 may include a knob 61 configured to switch from a locking state to an unlocking state in response to operation by the occupant and automatically return to the locking state using elastic force when operation by the occupant is released. The potation module 2 may also include a link mechanism (refer to an input link 62, a link bar 63, and an output link 64) configured to transmit operational force exerted on the knob 61 to the lock assembly 4. The operation module 2 may be configured such that the knob 61 that operated by the occupant is exposed to the outside.

The knob 61 may be disposed at the distal end of the armrest 30 so that the occupant conveniently operates the knob. The operation module 2 may further include a knob cover 71 coupled to a lower surface of the distal end portion of the armrest frame 32. The knob 61 may be protected by the knob cover 71. As shown in FIGS. 8 and 12, the knob cover 71 may be formed with an internal accommodation space and features a head opening 71*a* and a tail opening 71*b* that both communicate with the accommodation space. The head opening 71*a* may be formed to face the distal end of the armrest frame 32 in a forward direction, and the tail opening 71*b* may be formed to face the proximal end of the armrest frame 32 in a backward direction. The head opening 71*a* and the tail opening 71*b* may be disposed opposite each other.

Figure 9:
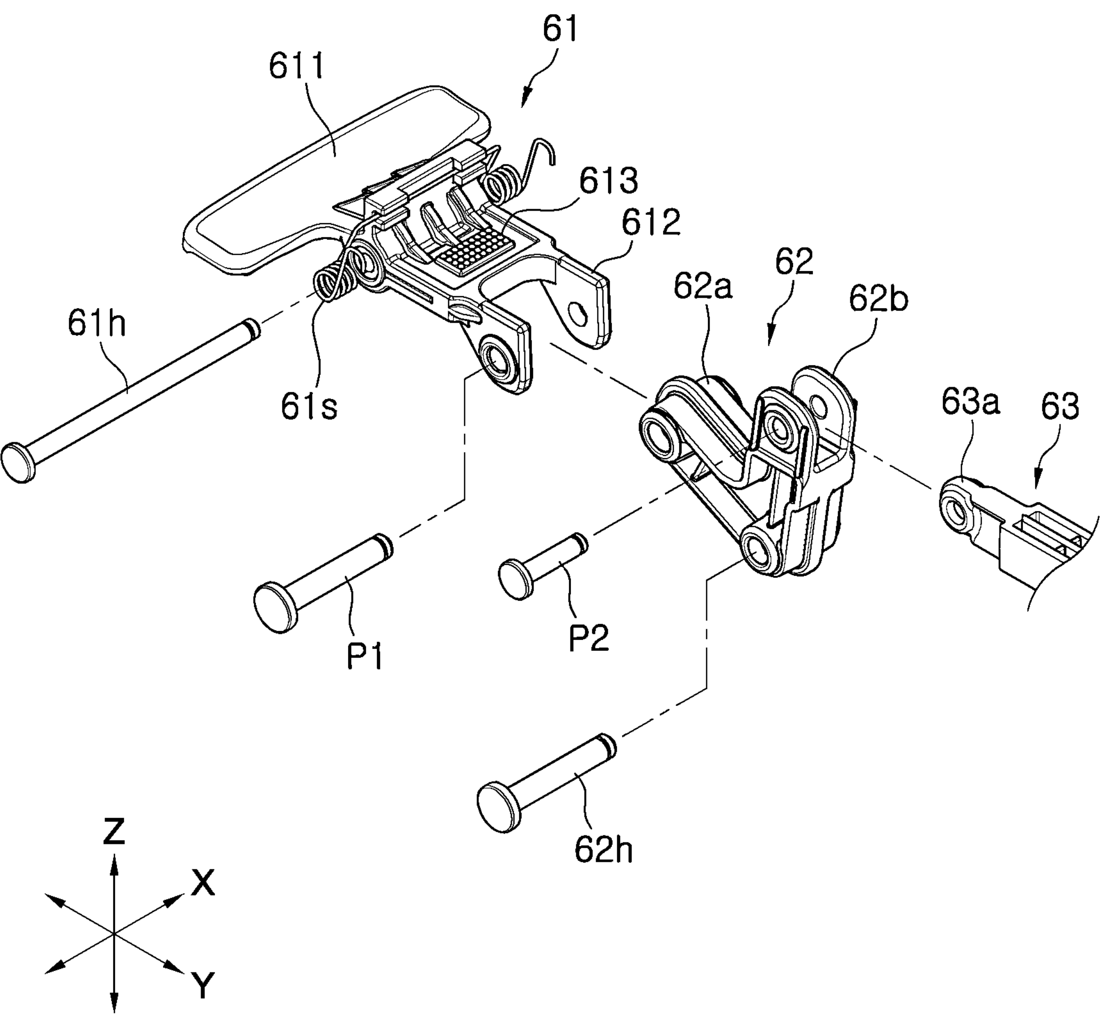

Referring to FIGS. 8 and 9, the knob 61 may be accommodated in the accommodation space in the knob cover 71. The knob 61 may be mounted in the accommodation space in the knob cover 71 so as to be rotatable about a knob pin 61*h*. The knob pin 61*h* may extend horizontally in the leftward-rightward direction (X-axis direction) to provide a knob axis parallel to the first axis A1.

The knob 61 may include a knob head 611 disposed close to the head opening 71*a* and a knob tail 612 disposed close to the tail opening 71*b*. The knob pin 61*h* may extend through a space disposed between the knob head 611 and the knob tail 612. The knob head 611 may be operated by the occupant, and the knob tail 612 may be connected to the link mechanism (refer to an input link 62, a link bar 63, and an output link 64) through the tail opening 71*b*.

Figures 12A, 12B:
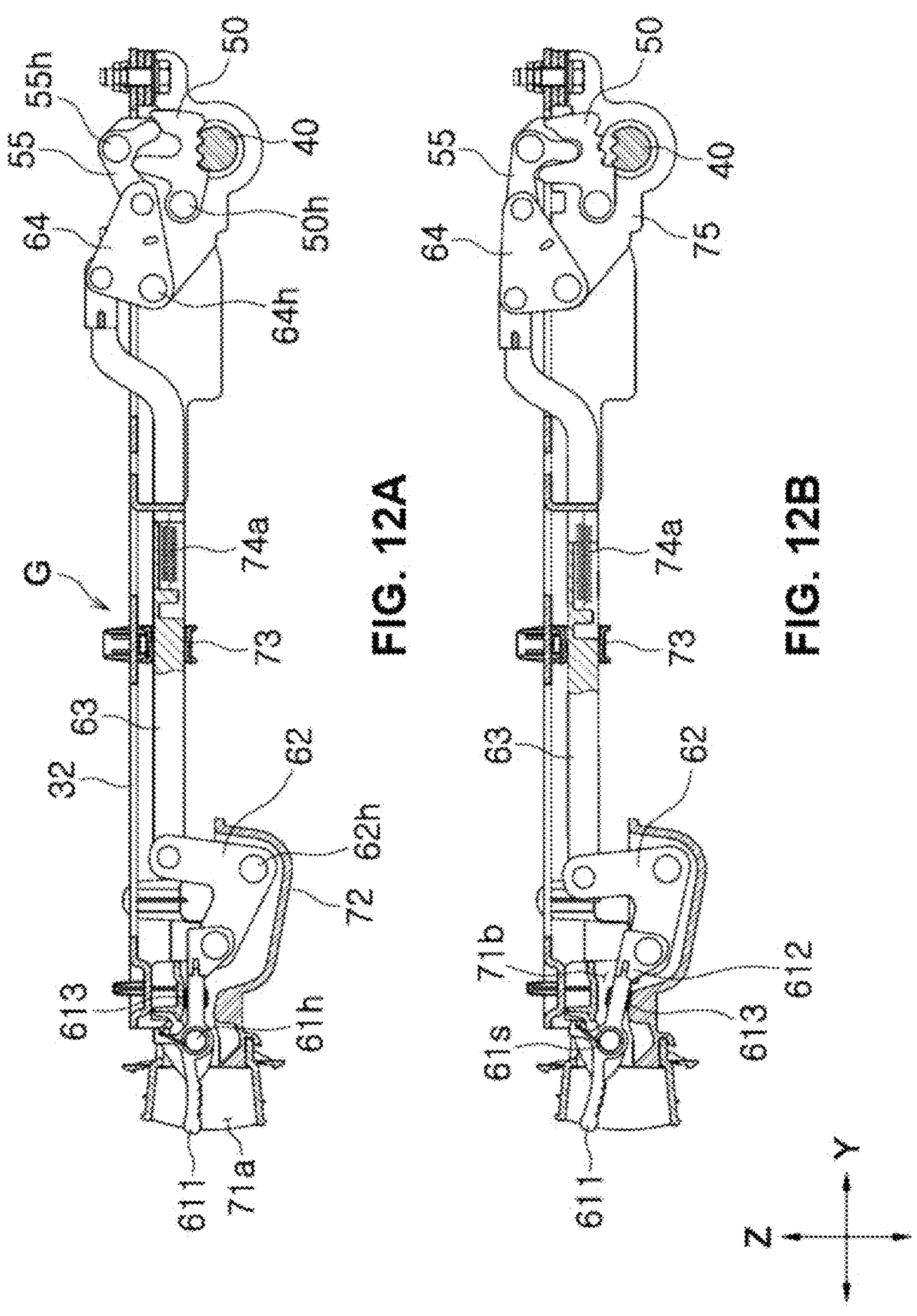
FIGS. 12A and 12B are partial cross-sectional views specifically showing operation of the locking device shown in FIGS. 8 to 11.
Figures 13A, 13B:
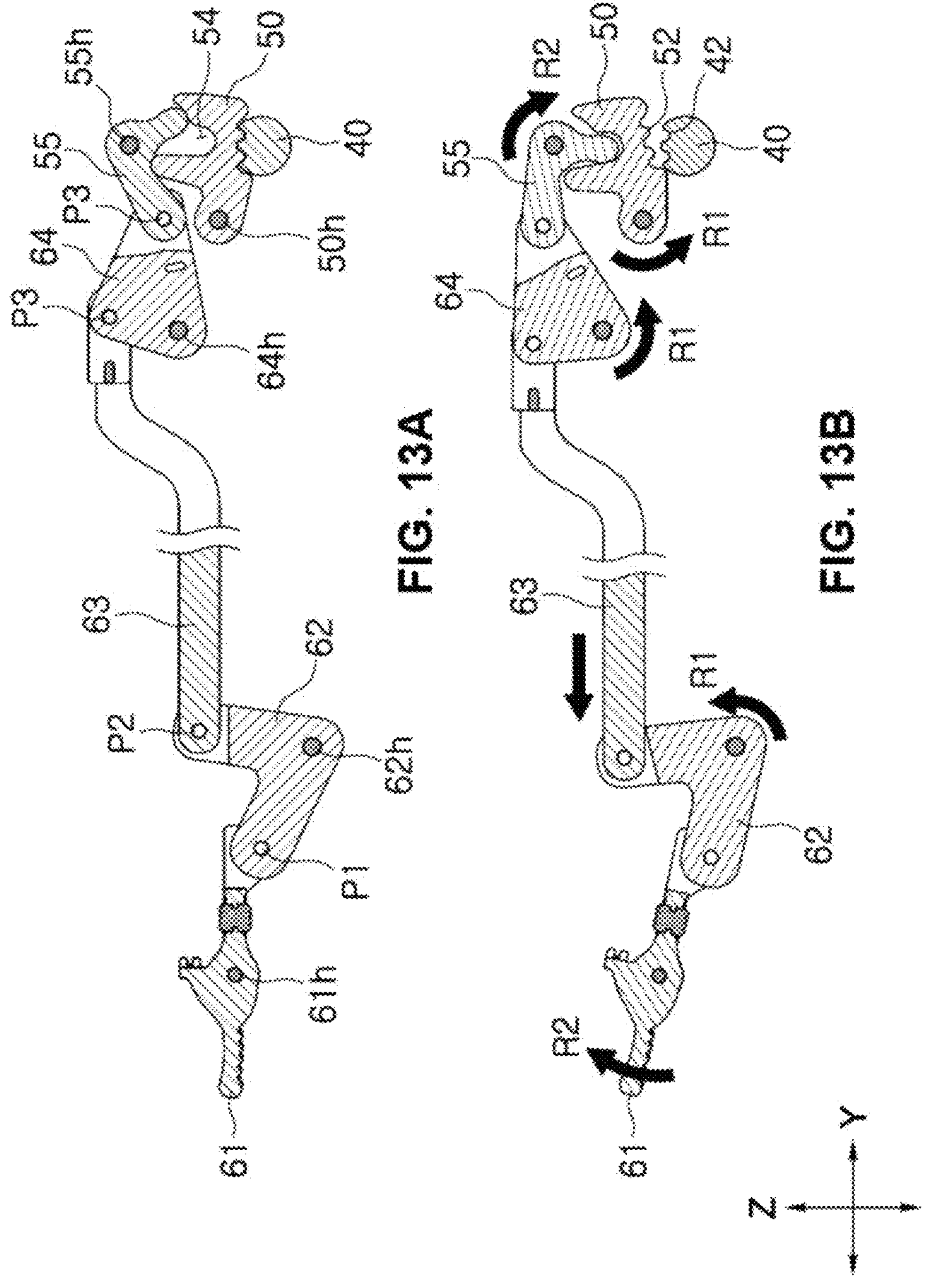
FIGS. 13A and 13B are cross-sectional views schematically showing operation of the locking device shown in FIGS. 8 to 11.

As shown in FIGS. 12B and 13B, when the occupant operates the knob head 611 in a manner of lifting the same, the knob 61 may be rotated in the second rotational direction R2 about the knob pin 61*h*, thereby causing the knob tail 612 to move downward and entering the unlocking state. At least one spring may be provided for return of the knob as shown in FIGS. 8 and 9. The spring for return of the knob 61 may be a torsion spring 61*s*. The torsion spring 61*s* may provide elastic force to the knob 61 to rotate the knob 61 in the first rotational direction R1. As shown in FIGS. 12A and 13A, when operation of the knob 61 by the occupant is released, the knob 61 may be rotated back in the first rotational direction R1 about the knob pin 61*h* by the torsion spring 61*s*, thereby entering the locking state.

The knob cover 71 may be configured to limit the rotational angle range of the knob 61. The knob cover 71 may improve the operational reliability of the knob 61 by limiting the rotational angle of the knob 61. The knob cover 71 may be formed to have a bottom portion that comes into contact with the lower surface of the knob tail 612 when the knob 61 is rotated in the second rotational direction R2 by operational force applied thereto by the occupant (when the knob enters the locking state) (refer to FIG. 12B). The knob cover 71 may be formed to have a top portion that comes into contact with the upper surface of the knob tail 612 when the knob 61 is rotated in the first rotational direction R1 by the elastic force of the torsion spring 61*s* (when the knob enters the locking state) (refer to FIG. 12A).

The knob 61 may include a buffer pad 613 having cushioning characteristics. The buffer pad 613 may be provided on each of the upper surface of the knob tail 612 that comes into contact with the top portion of the knob cover 71 and the lower surface of the knob tail 612 that comes into contact with the bottom portion of the knob cover 71 during rotational operation of the knob 61. This buffer pad 613 may prevent the occurrence of noise or damage to the knob 61 due to contact of the knob tail 612 with the bottom portion or the top portion of the knob cover 71.

Figure 11:
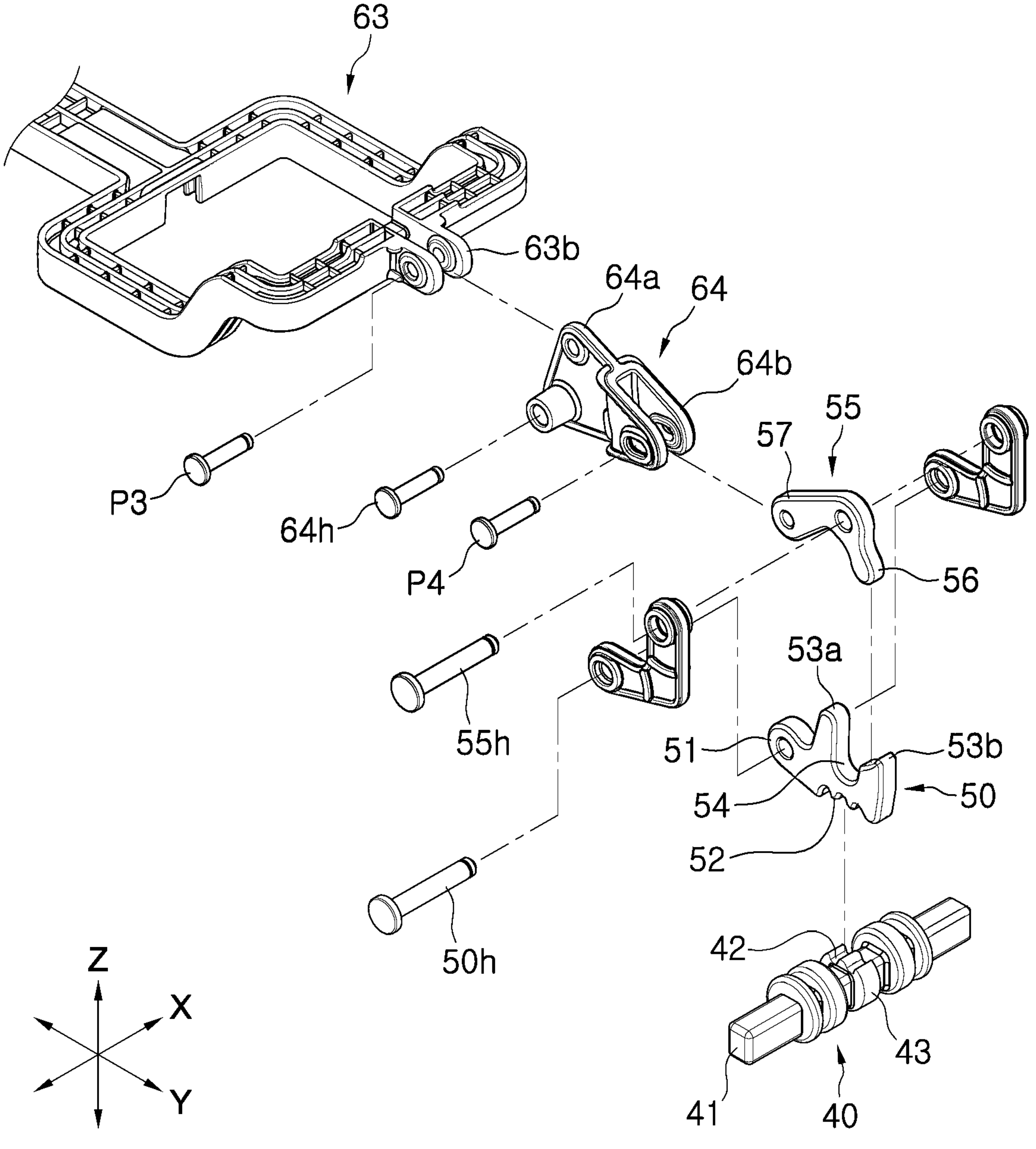

As shown in FIGS. 7, 10, and 11, the lock assembly 4 may be mounted to the proximal end portion 30*b* of the armrest 30. The lock assembly 4 may include a lock shaft 40 and locks (refer to a main lock 50 and a sub-lock 55).

Referring to FIGS. 6, 7, 11, and 14, the lock shaft 40 may be provided horizontally on the first axis A1 in the leftward-rightward direction (X-axis direction). The lock shaft 40 may be spaced apart from the lower surface of the armrest frame 32. The lock shaft 40 may be a fixed shaft maintained in a stationary state, and may be disposed between two fixed brackets 16 at both sides (left and right) of the armrest mount 10. Left and right end portions 41 of the lock shaft 40 may be respectively fixed to two fixed brackets 16, whereby the lock shaft 40 may function as a fixed shaft. The lock shaft 40 may include at least one locking recess 42 formed on its circumferential surface. The locking recess 42 may be positioned between the left and right end portions 41. The locking recess 42 may be formed such that the recess' entrance faces upward toward the lower surface of the armrest frame 32.

The locks include a main lock 50 and a sub-lock 55. As shown in FIG. 7, these locks may be disposed between the armrest frame 32 and the lock shaft 40. The locks may be mounted to the armrest frame 32 by means of a lock bracket 75. In detail, the lock bracket 75 may be coupled to the armrest frame 32, and the locks may be coupled to the lock bracket 75. Accordingly, when the armrest 30 is rotated about the first axis A1, the locks may be rotated together with the armrest 30 and thus may be moved around the lock shaft 40 about the first axis A1.

Referring to FIGS. 10 to 15, the main lock 50 may be moved by rotation in a first direction away from the lock shaft 40 or in a second direction approaching the lock shaft 40 in accordance with operation of the knob 61. The main lock 50 may be coupled to the lock bracket 75 and may be rotatable about a $2A^{th}$ axis A21 parallel to the first axis A1. Thereby, the main lock 50 may be moved by rotation in the first direction (i.e., counterclockwise) or in the second direction (i.e., clockwise) about the $2A^{th}$ axis A21.

The main lock 50 may include a front surface, a back surface, a fixed end 51, and a free end. The front surface of the main lock 50 faces the locking recess 42 in the lock shaft 40 when moved in the second direction in a state in which the posture of the armrest 30 is the first posture (0°). The back surface is formed opposite the front surface. The fixed end 51 is disposed relatively close to the distal end portion 30*a* of the armrest 30. The free end is located opposite the fixed end 51 and is disposed relatively close to the proximal end portion 30*b* of the armrest 30. A main lock pin 50*h* defining the $2A^{th}$ axis may penetrate horizontally the fixed end 51 of the main lock 50 in the leftward-rightward direction (X-axis direction). According to this configuration, when rotated in the first rotational direction R1, the main lock 50 may be moved in the first direction (i.e., lifted away from the lock shaft 40), and when rotated in the second rotational direction R2, the main lock 50 may be moved in the second direction (i.e., lowered toward the lock shaft 40). Further, when the knob 61 is switched from the locking state to the unlocking state by the occupant, the main lock 50 may be moved in the first direction (unlocking direction) (refer to FIGS. 12B and 13B). Conversely, when the knob 61 is restored to the locking state by the torsion spring 61*s*, the main lock 50 may be moved in the second direction (locking direction) (refer to FIGS. 12A and 13A).

The main lock 50 may include a locking tooth 52. The locking tooth 52 may be disposed on the front surface of the main lock 50. When the posture of the armrest 30 is the first posture (0°), if the main lock 50 is moved in the second direction (i.e., locking direction), the locking tooth 52 may be inserted into the locking recess 42, and if the main lock 50 is moved in the first direction (i.e., unlocking direction), the locking tooth 52 may be separated from the locking recess 42 (refer to FIGS. 12A, 12B, 13A and 13B). Because the lock shaft 40 is a fixed shaft and the main lock 50 is provided at the armrest 30 through the lock bracket 75, when the locking tooth 52 is inserted into the locking recess 42, the armrest 30 may be prevented from rotation, either in the first rotational direction R1 or the second rotational direction R2. Accordingly, the posture of the armrest 30 may be maintained at the first posture.

Figure 14:
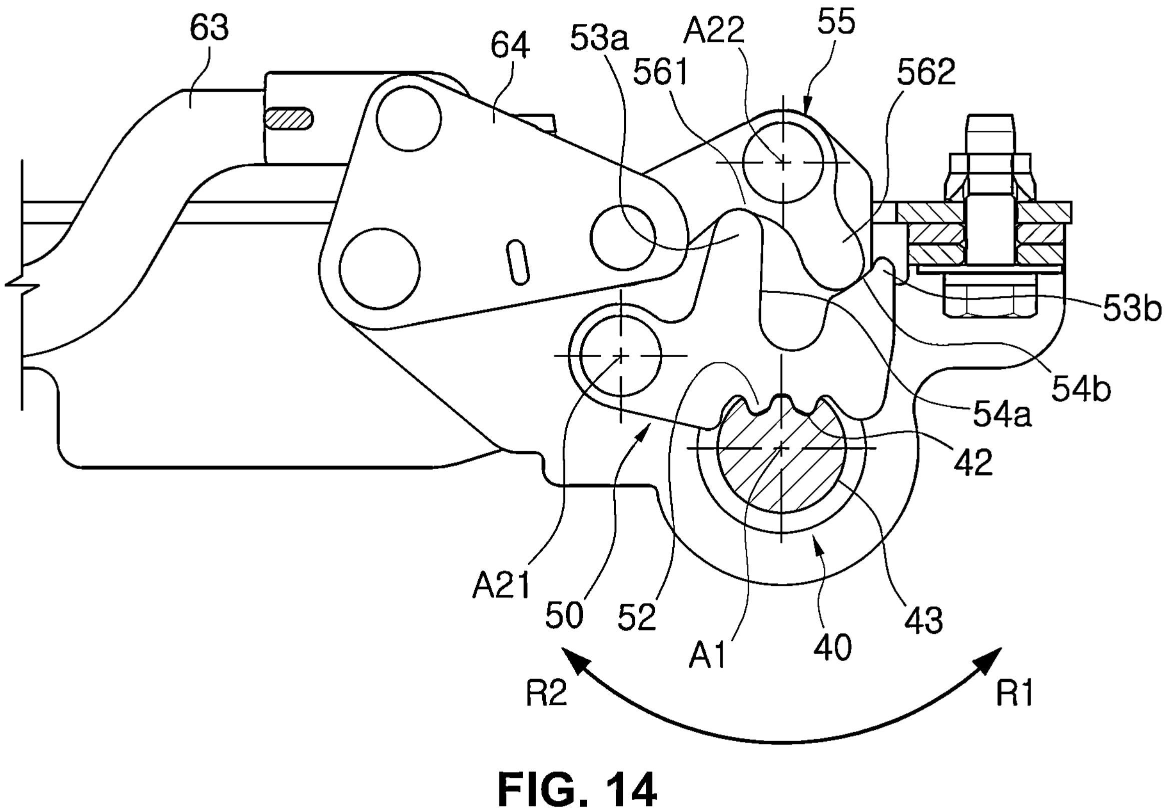
FIG. 14 is a view showing, based on FIGS. 12A and 12B, the state of a locking assembly of the locking device when the posture of the armrest is the first posture in the armrest assembly for vehicles according to the embodiment of the present disclosure.
Figure 15A:
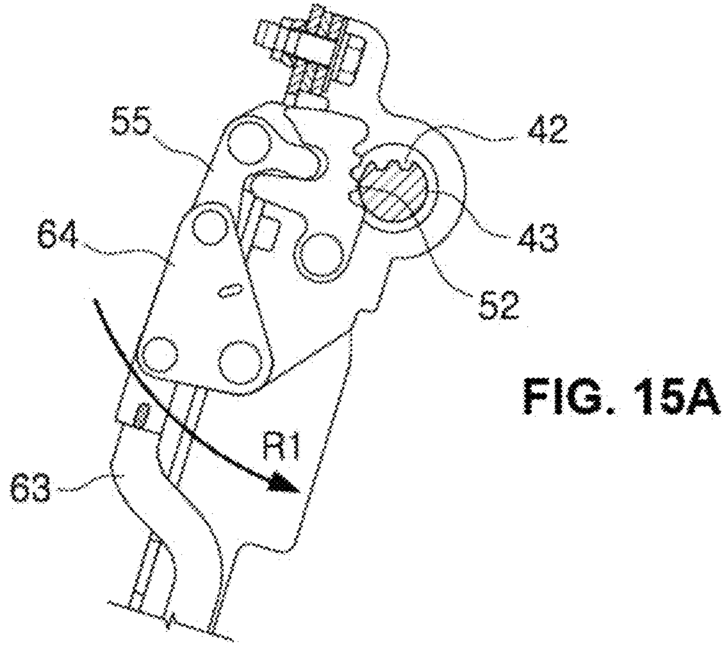
FIGS. 15A and 15B are views showing, based on FIGS. 12A and 12B, the state of the locking assembly of the locking device when the posture of the armrest is the second posture and the third posture in the armrest assembly for vehicles according to the embodiment of the present disclosure.
Figure 15B:
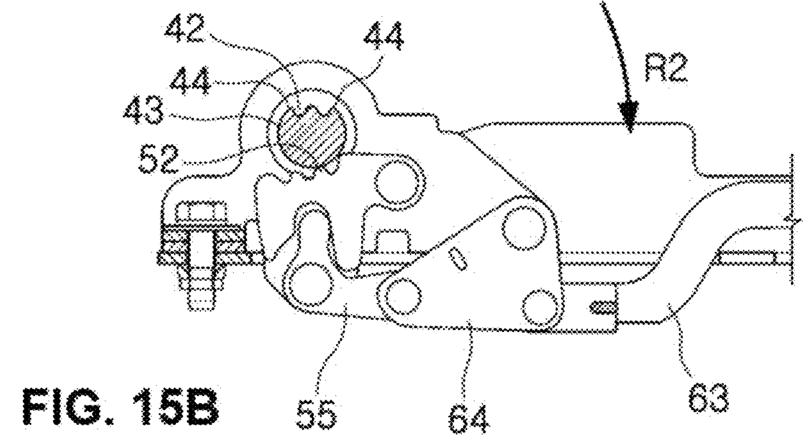

As shown in FIGS. 11 and 14, the lock shaft 40 may be formed such that a middle portion thereof between the left and right end portions 41 generally has a cylindrical shape. The lock shaft 40 may include a locking section having the locking recess 42 on a portion of the surface of the cylindrical shape and an unlocking section having an unlocking surface 43 extending to both sides from the locking section. The lock section and the unlocking section may be formed along the periphery of the middle portion of the lock shaft 40. In the entire section along the periphery of the middle portion of the lock shaft 40, a portion that faces upward (locking section) may include a recess defining the locking recess 42, and the remaining portion (unlocking section) may include the unlocking surface 43 generally having an arc shape (i.e., a partial cylindrical shape) centered on the first axis A1. Referring to FIGS. 15A and 15B, when the locking tooth 52 is separated from the locking recess 42 and when the armrest 30 in the first posture (0°) is rotated for posture change, the main lock 50 may be rotated together with the armrest 30 and the unlocking surface 43 may be brought into contact with the tooth end of the locking tooth 52. In this situation, the main lock 50 may be maintained in the state of being moved in the first direction. Accordingly, the knob 61 may remain in the unlocking state without separate operation by the occupant. In addition, when the posture of the armrest 30 is changed to the first posture, the knob 61 may enter the locking state due to the torsion spring 61*s*, and thus the locking tooth 52 may be inserted into the locking recess 42. Therefore, operation of the knob 61 required for change in the posture of the armrest 30 may be minimized.

As shown in FIGS. 15A and 15B, the locking section and the unlocking section of the lock shaft 40 may be connected to each other via a curved guide surface 44. The curved guide surface 44 may smoothly guide the locking tooth 52, whose tooth end is in contact with the unlocking surface 43, into the locking recess 42.

Referring to FIGS. 11 and 14, the main lock 50 may include a first shoulder 53*a* and a second shoulder 53*b* protruding from the back surface opposite the front surface. The main lock 50 also may include an interlocking recess 54 formed between the first shoulder 53*a* and the second shoulder 53*b*. The second shoulder 53*b* may be spaced apart from the first shoulder 53*a* in the direction in which the armrest 30 is moved when rotated in the second rotational direction R2.

The sub-lock 55 may be disposed between the armrest frame 32 and the main lock 50. The sub-lock 55 may be coupled to the lock bracket 75 so as to be rotatable about a 2B$^{th}$ axis A22 parallel to the first axis A1. The sub-lock 55 may be rotated in cooperation with the knob 61.

The sub-lock 55 may include an interlocking tooth 56. When the sub-lock 55 is rotated in the first rotational direction R1, the interlocking tooth 56 may be brought into contact with a second shoulder inner wall 54*b* in the interlocking recess 54, thereby rotating the main lock 50 in the second rotational direction R2. Conversely, when the sub-lock 55 is rotated in the second rotational direction R2, the interlocking tooth 56 may be brought into contact with a first shoulder inner wall 54*a* in the interlocking recess 54, thereby rotating the main lock 50 in the first rotational direction R1. The interlocking tooth 56 may include a tooth base 561 (refer to FIG. 14) disposed on the 2B$^{th}$ axis A22 and a tooth head 562 (refer to FIG. 14) protruding from the tooth base 561.

A sub-lock pin 55*h* defining the 2B$^{th}$ axis may penetrate horizontally the tooth base 561 of the sub-lock 55 in the leftward-rightward direction (X-axis direction). When the sub-lock 55 is rotated in the first rotational direction R1, the tooth base 561 may be brought into the contact with the first shoulder inner wall 54*a*, and the tooth head 562 may be brought into contact with the second shoulder inner wall 54*b*, whereby the interlocking tooth 56 may transmit the rotational force of the sub-lock 55 in the first rotational direction R1 to the main lock 50 in a manner of distributing the rotational force in two opposite rotational directions through the first shoulder 53*a* and the second shoulder 53*b*. According to this configuration, when the locking tooth 52 is inserted into the locking recess 42, it may be possible to prevent the main lock 50 from being rotated in the first rotational direction R1 or the second rotational direction R2. Accordingly, the posture of the armrest 30 may be stably maintained at the first posture (0°) with greater restriction force.

Referring to FIGS. 9, 11, 12A, and 12B, the link mechanism may include a plurality of links configured to allow the locks 50 and 55 to interlock with the knob 61. In detail, the link mechanism may include an input link (first link) 62, a link bar 63, and an output link (second link) 64, which are sequentially connected to each other. The input link 62 may connect the knob 61 to the link bar 63, the link bar 63 may connect the input link 62 to the output link 64, and the output link 64 may connect the link bar 63 to the sub-lock 55. The sub-lock 55 may include a connecting arm 57 extending from the tooth base 561 toward the distal end of the armrest 30.

The knob tail 612 of the knob 61 and a first end portion 62*a* of the input link 62 may be connected to each other via a first link pin P1, a second end portion 62*b* of the input link 62 and a first end portion 63*a* of the link bar 63 may be connected to each other via a second link pin P2, a second end portion 63*b* of the link bar 63 and a first end portion 64*a* of the output link 64 may be connected to each other via a third link pin P3, and a second end portion 64*b* of the output link 64 and the connecting arm 57 of the sub-lock 55 may be connected to each other via a fourth link pin P4.

The link bar 63 may be movable toward the distal end or the proximal end of the armrest 30 (movable in the extension direction of the armrest). The input link 62 may move the link bar 63 toward the distal end or the proximal end of armrest 30 in accordance with rotation of the knob 61. Then, the output link 64 may rotate the sub-lock 55 in accordance with movement of the link bar 63. The input link 62 may be rotated about a first axis pin 62*h* disposed horizontally in the leftward-rightward direction (X-axis direction), and the output link 64 may be rotated about a second axis pin 64*h* disposed horizontally in the leftward-rightward direction (X-axis direction). When the knob 61 is operated by the occupant, the input link 62 may be rotated in the first rotational direction R1 about the first axis pin 62*h*, thereby moving the link bar 63 toward the distal end of the armrest 30. Then, the output link 64 may be rotated in the first rotational direction R1 about the second axis pin 64*h*, thereby rotating the sub-lock 55 in the second rotational direction R2.

Referring to FIGS. 7, 12A, 12B, 13A, and 13B, the operation module 2 may further include a first elastic member 74*a* configured to provide elastic force to the link bar 63 toward the proximal end of the armrest 30 so that, when operational force applied to the knob 61 by the occupant is released, the link bar 63 returns toward the proximal end of armrest 30. In addition, referring to FIGS. 7, 13A and 13B, the operation module 2 may further include a second elastic member 74*b* configured to allow the output link 64 to return to the original position (by rotating the output link 64 in the second rotational direction R2 about the second axis pin 64*h*) using the elastic force thereof when operational force applied to the knob 61 by the occupant is released.

Figure 16:
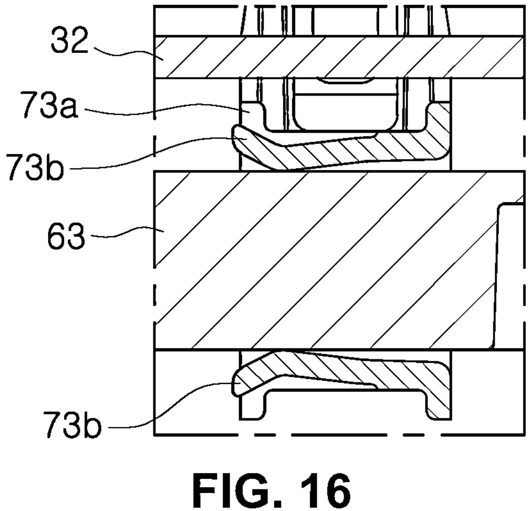
FIG. 16 is an enlarged view of portion G in FIGS. 12A and 12B.

The operation module 2 may further include a link guide 73 configured to guide movement of the link bar 63. As shown in FIG. 16, the link guide 73 may include guide members 73*a* in contact with a left side and a right side of a straight section of the link bar 63, respectively, and contact members 73*b* in contact with an upper side and a lower side of the straight section of the link bar 63, respectively. Each of the contact members 73*b* may be formed to be elastically deformable in accordance with upward/downward movement of the link bar 63 caused by rotation of the input link 62 and the output link 64 in the process in which the link bar 63 is moved toward the distal end and the proximal end of the armrest 30. In one example, the contact members 73*b* may be leaf springs applied to the main body of the link guide 73 in a cantilever manner. The link guide 73 may serve to ensure accurate movement of the link bar 63 while coping with upward/downward movement of the link bar 63 and to prevent deformation of the link bar 63.

As is apparent from the above description, according to the embodiment of the present disclosure, when the posture of an armrest is a first posture (locking posture), a main lock interlocking with a knob may be moved in a second direction (locking direction), and a locking tooth of the main lock may be inserted into a locking recess in a lock shaft (restriction of the armrest). When the main lock is moved in a first direction (unlocking direction) so that the locking tooth is separated from the locking recess and when the armrest in the first posture is rotated, a tooth end of the locking tooth may be brought into contact with an unlocking surface of the lock shaft, and thus the main lock may be maintained in the state of being moved in the first direction. Therefore, an unlocking state may be maintained without separate operation of the knob by an occupant, and accordingly, operation of the knob required for change in the posture of the armrest may be minimized.

In addition, according to the embodiment of the present disclosure, since a sub-lock, which operates the main lock in cooperation with the knob, transmits operational force applied to the knob to the main lock in a manner of distributing the operational force in two opposite rotational directions, it may be possible to more stably and securely maintain the state in which the locking tooth is inserted into the locking recess.

In addition, according to the embodiment of the present disclosure, since the armrest is disposed between a driver seat and a front passenger seat, which are front seats, and the posture thereof is capable of being changed to a posture (third posture) protruding toward a rear seat in accordance with rotation thereof, an occupant on the rear seat may use the armrest as a table or the like.

In addition, according to the embodiment of the present disclosure, since the posture of the armrest is capable of being changed to a posture (second posture) folded with respect to an armrest mount in accordance with rotation of the armrest, use convenience of an occupant may be further improved. Furthermore, by virtue of the folded posture (second posture), seat variation may be more easily performed without interference with the armrest.

The effects achievable through the disclosure are not limited to the above-mentioned effects, and other effects not mentioned herein will be clearly understood by those skilled in the art from this specification and the accompanying drawings.

While the present disclosure has been described above, the present disclosure is not limited to the disclosed embodiments and the accompanying drawings, and those skilled in the art may variously modify the present disclosure without departing from the technical spirit of the present disclosure. Also, it is noted that any one feature of an embodiment of the present disclosure described in the specification may be applied to another embodiment of the present disclosure. Similarly, the present invention encompasses any embodiment that combines features of one embodiment and features of another embodiment. In addition, the technical features described in the embodiments of the present disclosure may be independently carried out or two or more technical features may be combined.

What is claimed is:

1. An armrest assembly for a vehicle, the armrest assembly comprising:

an armrest mount, wherein a height direction is defined as a direction extending from a bottom to a top of the armrest mount, a width direction is defined as a direction extending from a left side toward a right side of the armrest mount, and a longitudinal direction is defined as a direction extending from a front side toward a rear side of the armrest mount;

an armrest mounted on the armrest mount and configured to be rotatable about a first axis extending in the width direction, the armrest being configured to be changeable in posture to a first posture in which a distal end of the armrest is oriented forward in the longitudinal direction, a second posture in which the distal end is oriented downward in the height direction, and a third posture in which the distal end is oriented rearward in the longitudinal direction according to rotation of the armrest about the first axis;

an operation module provided at the armrest, the operation module comprising a knob configured to switch from a locking state to an unlocking state in response to operation by an occupant of the vehicle and to return to the locking state using elastic force when operation by the occupant is released;

a lock shaft fixed on the first axis; and a main lock provided at the armrest so as to be movable in a first direction away from the lock shaft or a second direction toward the lock shaft in accordance with operation of the knob, wherein the lock shaft comprises a locking section having a locking recess and an unlocking section extending to both sides from the locking section, the locking section and the unlocking section being formed along a periphery of the lock shaft, wherein the main lock comprises a locking tooth, wherein, when the armrest is in the first posture, if the main lock is moved in the second direction, the locking tooth is inserted into the locking recess, and if the main lock is moved in the first direction, the locking tooth is separated from the locking recess, and wherein the unlocking section comprises an unlocking surface configured to be brought into contact with a tooth end of the locking tooth to maintain the main lock in a state of being moved in the first direction.

2. The armrest assembly as claimed in claim 1, wherein the main lock is configured to be rotatable about a $2A^{th}$ lock axis parallel to the first axis, and wherein, when the main lock is rotated in a first rotational direction, the main lock is moved in the first direction, and when the main lock is rotated in a second rotational direction opposite the first rotational direction, the main lock is moved in the second direction.

3. The armrest assembly as claimed in claim 2, wherein the main lock comprises a front surface on which the locking tooth is disposed, a back surface opposite the front surface, a first shoulder and a second shoulder, each protruding from the back surface, and an interlocking recess formed between the first shoulder and the second shoulder, wherein the second shoulder is spaced apart from the first shoulder in a direction in which the armrest is moved when rotated in the second rotational direction, wherein the armrest assembly further comprises a sub-lock provided at the armrest, the sub-lock being configured to be rotatable about a $2B^{th}$ lock axis parallel to the $2A^{th}$ lock axis and to be rotated in cooperation with the knob, wherein the sub-lock comprises an interlocking tooth configured to be brought into contact with a second shoulder inner wall in the interlocking recess when the sub-lock is rotated in the first rotational direction, thereby rotating the main lock in the second rotational direction, and to be brought into contact with a first shoulder inner wall in the interlocking recess when the sub-lock is rotated in the second rotational direction, thereby rotating the main lock in the first rotational direction, wherein the interlocking tooth comprises a tooth base disposed on the $2B^{th}$ lock axis and a tooth head protruding from the tooth base, and wherein, when the sub-lock is rotated in the first rotational direction, the tooth base is brought into contact with the first shoulder inner wall, and the tooth head is brought into contact with the second shoulder inner wall, so that the interlocking tooth transmits rotational force of the sub-lock in the first rotational direction to the main lock in a manner of distributing the rotational force in two opposite rotational directions through the first shoulder and the second shoulder.

4. The armrest assembly as claimed in claim 3, wherein the armrest comprises a proximal end disposed on the first axis, wherein the knob is disposed close to a distal end of the armrest, and wherein the operation module comprises a link mechanism configured to transmit operational force applied to the knob to the sub-lock.

5. The armrest assembly as claimed in claim 4, wherein the operation module further comprises a knob cover including a head opening disposed close to the distal end of the armrest and a tail opening disposed opposite the head opening, wherein the knob is provided in the knob cover so as to be rotatable about a knob axis extending in the width direction, and comprises a knob head disposed close to the head opening and a knob tail disposed opposite the knob head with respect to the knob axis and connected to the link mechanism through the tail opening, and wherein the knob cover is configured to be brought into contact with an upper surface of the knob tail or a lower surface of the knob tail in accordance with rotation of the knob to limit rotation of the knob.

6. The armrest assembly as claimed in claim 5, wherein the knob comprises a buffer element provided on each of the upper surface and the lower surface of the knob tail, which come into contact with the knob cover.

7. The armrest assembly as claimed in claim 4, wherein the knob is configured to be rotatable about a knob axis extending in the width direction, and wherein the link mechanism comprises:

a link bar configured to be movable toward the distal end and the proximal end of the armrest;

an input link disposed between the knob and the link bar, the input link being configured to move the link bar toward the distal end or the proximal end of the armrest in accordance with rotation of the knob; and an output link disposed between the link bar and the sub-lock, the output link being configured to rotate the sub-lock in accordance with movement of the link bar.

8. The armrest assembly as claimed in claim 7, wherein the link mechanism is configured such that, when the knob is operated by an occupant, the input link moves the link bar toward the distal end of the armrest and the output link rotates the sub-lock in the second rotational direction, and wherein the operation module further comprises an elastic member configured to provide elastic force to the link bar toward the proximal end of the armrest.

9. The armrest assembly as claimed in claim 7, wherein each of the input link and the output link is a rotation link configured to be rotated about a link axis extending in the width direction, wherein the operation module further comprises a link guide configured to guide movement of the link bar, wherein the link guide comprises guide members in contact with a left side and a right side of a straight section of the link bar, respectively, and contact members in contact with an upper side and a lower side of the straight section, respectively, and wherein each of the contact members is elastically deformable in accordance with upward/downward movement of the link bar caused by rotation of the input link and the output link in a process in which the link bar is moved toward the distal end and the proximal end of the armrest.

10. The armrest assembly as claimed in claim 1, wherein the armrest mount is disposed between a driver seat and a front passenger seat, each being a front seat, and wherein, when the armrest is in the first posture, the armrest is provided to an occupant on the front seat, and when the armrest is in the third posture, the armrest is provided to an occupant on a rear seat.

11. The armrest assembly as claimed in claim 1, wherein the armrest mount comprises a support configured to support the armrest in an erected state so that the armrest is rotatable about the first axis, and wherein, when the armrest is in the second posture, the armrest is folded with respect to the support.

12. The armrest assembly as claimed in claim 1, wherein the armrest mount comprises:

a fixed member;

a movable member coupled onto the fixed member so as to be movable in a horizontal direction which is perpendicular to the height direction; and a support provided at the movable member, the support being configured to support the armrest so that the armrest is rotatable about the first axis.

13. The armrest assembly as claimed in claim 12, wherein the armrest mount further comprises a stop unit configured to fix a position of the movable member with respect to the fixed member.

14. The armrest assembly as claimed in claim 1, wherein the locking section and the unlocking section are connected to each other via a curved guide surface.

15. An armrest assembly comprising:

an armrest mount;

an armrest mounted on the armrest mount and configured to be rotatable about a main axis, the armrest being configured to be changed in posture in accordance with rotation thereof;

a knob provided at the armrest;

a lock shaft fixed on the main axis; and a lock provided at the armrest so as to be movable in a locking direction approaching the lock shaft and an unlocking direction away from the lock shaft in accordance with operation of the knob, wherein the lock shaft comprises a locking section having a locking recess and an unlocking section extending to both sides from the locking section, the locking section and the unlocking section being formed along a periphery of the lock shaft, wherein the lock comprises a locking tooth, wherein, when the armrest is in a locking posture, if the lock is moved in the locking direction, the locking tooth is inserted into the locking recess, and if the lock is moved in the unlocking direction, the locking tooth is separated from the locking recess, and wherein the unlocking section comprises an unlocking surface configured to be brought into contact with a tooth end of the locking tooth to maintain the lock in a state of being moved in the unlocking direction.

16. The armrest assembly as claimed in claim 15, further comprising a link mechanism comprising a plurality of links configured to allow the lock to interlock with the knob.

* * * * *